PROCESS FOR THE PREPARATION OF ALKYL DIFLUORAMINES

Robert A. Wiesboeck, Atlanta, Ga., assignor to Rohm & Haas Company, Philadelphia, Pa., a corporation of Delaware
No Drawing. Filed Nov. 19, 1963, Ser. No. 324,889
7 Claims. (Cl. 260—583)

This invention concerns a process for the preparation of alkyl difluoramines by the aqueous fluorination of N-substituted alkyl sulfonamides and alkyl sulfamates. The products are of interest as high energy components for use in propellant formulations.

Alkyl difluoramines have been prepared by reacting alkyl iodides and tetrafluorohydrazine by irradiating the mixture with ultraviolet light. This method is time-consuming and expensive and the yield and purity of the product obtained are low. It is a difficult reaction to scale up. It is also known that the aqueous fluorination of N-substituted alkylureas produces alkyl difluoramines. However, the reaction product is a complex mixture of alkyl difluoramines, fluoroalkyl difluoramine and difluorourea which is difficult to separate from the desired product. Furthermore, the yields by this process are low.

It has been found that the fluorination in aqueous solution of N-substituted alkyl sulfonamides and alkyl sulfamates produces high yields of high purity alkyl difluoramines. Trifluoroethanol can also be used. Furthermore, it has been found that the reaction proceeds rapidly. The reaction is shown by the following equation:

$$RNHSO_2R^1 + F_2 \rightarrow RNF_2 + FSO_2R^1$$

in which R is an alkyl group containing up to 5 carbon atoms, and $R^1$ is ONa, $NH_2$ or the same as R. Particularly preferred is the compound in which $R^1$ is ONa since it represents the member with the highest solubility in water and is readily prepared by known methods.

The reaction is carried out by passing fluorine diluted with 70 to 97% of an inert gas, such as nitrogen, helium or argon into the stirred aqueous solution of the compound to be fluorinated at temperatures ranging from 0 to 60° C., preferably at 20° C. to 30° C. The gas which is evolved is passed over a drying agent, such as Drierite or Linde Molecular Sieve No. 4A and collected in a cold trap maintained at −78° C.

The temperature of the trap will vary somewhat depending on the particular alkyl difluoramine being prepared. Thus, in the case of methyl difluoramine, a trap temperature of −120° C. was employed.

An excess of fluorine is employed, and a particularly preferred ratio is 3 moles of fluorine to 2 moles of the sulfonamide or sulfamate.

The concentration of the sulfonamide or sulfamate in the aqueous solution is not critical, and can be from 2% by weight to 10% by weight. The use of the 5% solution is preferred.

EXAMPLE I

*Preparation of methyldifluoramine*

Into a stirred solution of 26.8 grams of sodium N-methyl sulfamate in 400 grams of water is passed a stream of fluorine, diluted with 60–90 volume percent nitrogen at a rate of 2 liters fluorine per hour. A 3 mm. I.D. glass tube, reaching to the bottom of the flask is used as gas inlet. The temperature of the reaction vessel is maintained at 15–20° C. The off-gas is passed through a tube containing Drierite into two traps which are immersed into cold baths of −120° C. After a total of 12 liters of fluorine has been passed into the reactor the contents of both cold traps are combined and pumped down to a pressure of at least 2 mm. Hg.

The product, at −120° C., a white solid, is essentially pure methyldifluoramine having a formula $CH_3NF_2$. It melts at −115° C. and boils at −16° C.

EXAMPLE II

*Preparation of ethyldifluoramine*

Sodium N-ethylsulfamate, 29.6 grams, is dissolved in water, 400 grams, and reacted with 12 liters of fluorine in the same manner as in Example I. The temperature of the reaction solution is maintained at 25° C. to 30° C. and the off-gas is passed through two traps maintained at −78° C. The pressure of the complete system is reduced to 275 mm. throughout the run. After pumping to a pressure of at least 2 mm. both traps contain essentially pure ethyldifluoramine; formula $C_2H_5NF_2$, B.P. 15° C.

EXAMPLE III

*Preparation of n-propyldifluoramine*

The procedure of Example II is followed, using sodium N-n-propylsulfamate, 32.4 grams, water, 400 grams, and fluorine, 12 liters, diluted by nitrogen, 68 liters. The product is a colorless liquid boiling at 65–67° C.; formula $C_3H_7NF_2$.

EXAMPLE IV

*Preparation of iso-propyldifluoramine*

The procedure of Example II is followed, using sodium N-isopropylsulfamate, 32.4 grams, water, 400 grams, and fluorine, 12 liters, diluted by nitrogen, 68 liters. The off-gas is passed over sodium fluoride pellets in addition to the drying agent and is collected in a Kel-F trap at −78° C. The product, a colorless liquid boils at 44–46° C. On storage in glass containers decomposition to acetone occurs.

EXAMPLE V

*Preparation of n-butyldifluoramine*

The procedure of Example II is followed, using sodium N-n-butylsulfamate, 35.2 grams, water, 400 grams, and fluorine, 12 liters, diluted by nitrogen, 68 liters. The product is a colorless liquid boiling at 81–84° C.; formula n-$C_4H_9NF_2$.

EXAMPLE VI

*Preparation of iso-butyldifluoramine*

The procedure of Example II is followed using sodium N-iso-butylsulfamate, 35.2 grams, water, 400 grams, and fluorine, 12 liters, diluted by nitrogen, 68 liters. The off-gas is passed over dry sodium fluoride pellets and stored in a Kel-F container. The product, a colorless liquid boils at 61° C.; formula $(CH_3)_2CHCH_2NF_2$.

EXAMPLE VII

*Preparation of se-butyldifluoramine*

The procedure of Example II is followed, using sodium N-sec-butylsulfamate, 35.2 grams, water, 400 grams, and fluorine, 12 liters, diluted with nitrogen, 68 liters. The product is a colorless liquid boiling at 86°; formula $C_2H_5CHNF_2CH_3$. In glass containers dehydrofluorination and hydrolysis take place forming methyl ethyl ketone.

EXAMPLE VIII

The procedure of Example II is followed, using sodium n-pentylsulfamate, 36.8 grams, water, 400 grams, and fluorine, 12 liters, diluted with nitrogen, 68 liters. The product is a colorless liquid boiling at 102–103° C.; formula n-$C_5H_{11}NF_2$.

EXAMPLE IX

Preparation of $CH_3NF_2$

A 10 millimole sample of N-methyl-p-toluenesulfonamide was dissolved in 40 ml. of trifluoroethanol. The solution was placed in a fluorination apparatus and a stream of fluorine diluted with helium (approximately 5–10% fluorine) was passed through the solution at a rate of 8.2 ml. $F_2$/mm. at a temperature of 20°. A Dry Ice condenser was placed at the gas outlet of the reaction flask to retain the $CF_3CH_2OH$. A trapping system employing four traps at −80°, −126°, −126°, and −196° was used to isolate the products. The $CH_3NF_2$ was isolated in the 126° trap. The optimum fluorine/substrate ratio for maximum yield was 8 moles of fluorine per mole of substrate. Yield: 77%. When the $F_2$/substrate ratio was increased to 12/1, the yield dropped to 4.8 millimoles.

EXAMPLE X

Preparation of $C_2H_5NH_2$

A 10 millimole sample of $CH_3\phi SO_2NHC_2H_5$ was dissolved in 50 ml. $CF_3CH_2OH$ and the solution placed in a fluorination apparatus. A mixture of helium and fluorine was passed through at a rate of 20 millimoles of fluorine per hour for one hour while the solution was maintained at 35°. A 0° condenser was placed in the reactor outlet to retain the $CF_3CH_2OH$. A series of three traps at −80°, −126°, and −196° was employed to isolate the reaction product, The $C_2H_5NF_2$ formed was trapped in the −126° trap. Yield: 22%.

I claim:
1. A process for the preparation of alkyl difluoramines which comprises treating compounds selected from the group consisting of alkyl sulfonamides and alkyl sulfamates of the general formula

$$RNHSO_2R^1$$

in which R is alkyl containing 1 to 5 carbon atoms and $R^1$ is selected from the group consisting of ONa, $NH_2$ and R with fluorine in aqueous solution.

2. A process as set forth in claim 1 in which the fluorine is diluted with an inert gas selected from the group consisting of nitrogen, helium and argon.

3. A process as set forth in claim 1 in which $R^1$ is ONa.

4. A process as set forth in claim 1 in which the reaction pressure is substantially atmospheric.

5. A process as set forth in claim 1 in which the reaction temperature is in the range of 0° C. to 60° C.

6. A process as set forth in claim 1 in which the molar ratio of fluorine to the compound selected from the group consisting of alkyl sulfonamides and alkyl sulfamates is from 3 moles to 2 moles.

7. A process as set forth in claim 1 in which the reaction temperature is in the range 20° C. to 30° C.

References Cited

UNITED STATES PATENTS

| | | | |
|---|---|---|---|
| 3,166,595 | 1/1965 | Frazer | 260—583 |
| 3,228,936 | 1/1966 | Davis et al. | 260—249.6 |
| 3,278,595 | 10/1966 | Sheehan et al. | 260—553 |

CHARLES B. PARKER, *Primary Examiner.*

B. BILLIAN, *Assistant Examiner.*